United States Patent
Lee et al.

(10) Patent No.: US 10,993,209 B2
(45) Date of Patent: Apr. 27, 2021

(54) METHOD FOR PERFORMING DATA COMMUNICATION IN WIRELESS COMMUNICATION SYSTEM AND TERMINAL USING SAME METHOD

(71) Applicant: LG Electronics Inc., Seoul (KR)

(72) Inventors: Seungmin Lee, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/480,772

(22) PCT Filed: Jan. 26, 2018

(86) PCT No.: PCT/KR2018/001194
§ 371 (c)(1),
(2) Date: Jul. 25, 2019

(87) PCT Pub. No.: WO2018/139904
PCT Pub. Date: Aug. 2, 2018

(65) Prior Publication Data
US 2020/0008179 A1    Jan. 2, 2020

Related U.S. Application Data

(60) Provisional application No. 62/450,569, filed on Jan. 26, 2017.

(51) Int. Cl.
*H04W 72/04*     (2009.01)
*H04W 72/02*     (2009.01)
*H04L 5/00*      (2006.01)
*H04L 1/00*      (2006.01)
*H04W 76/27*     (2018.01)
*H04L 1/16*      (2006.01)
(Continued)

(52) U.S. Cl.
CPC .......... *H04W 72/04* (2013.01); *H04L 1/1664* (2013.01); *H04L 5/0053* (2013.01); *H04L 5/0092* (2013.01); *H04L 5/1446* (2013.01); *H04W 36/0083* (2013.01); *H04W 76/27* (2018.02)

(58) Field of Classification Search
None
See application file for complete search history.

(56) References Cited

U.S. PATENT DOCUMENTS

2015/0249998 A1*  9/2015  Long .................... H04W 72/085
                                              370/329
2018/0184444 A1*  6/2018  Li ......................... H04L 5/0094
(Continued)

OTHER PUBLICATIONS

International Search Report of Appl'n No. PCT/KR2018/001194, dated Apr. 25, 2018.
(Continued)

*Primary Examiner* — Hong S Cho
(74) *Attorney, Agent, or Firm* — Dentons US LLP

(57) ABSTRACT

The present invention provides a data communication performing method performed by a terminal in a wireless communication system, the method comprising: determining a resource configured for data communication having a relatively short latency requirement; and performing, on the resource, the data communication having the relatively short latency requirement, wherein the resource is a semi-statically configured resource.

14 Claims, 17 Drawing Sheets

(51) Int. Cl.
*H04L 5/14* (2006.01)
*H04W 36/00* (2009.01)

(56) References Cited

U.S. PATENT DOCUMENTS

| | | | | |
|---|---|---|---|---|
| 2019/0149309 | A1* | 5/2019 | Kuang | H04L 5/0037 370/329 |
| 2019/0306836 | A1* | 10/2019 | Hong | H04L 1/00 |
| 2019/0342769 | A1* | 11/2019 | Li | H04L 5/0064 |
| 2020/0154481 | A1* | 5/2020 | Goto | H04W 74/004 |
| 2020/0187225 | A1* | 6/2020 | Xia | H04L 1/18 |

OTHER PUBLICATIONS

LG Electronics, "On Multiplexing between eMBB and URLLC," R1-1611849, 3GPP TSG RAN WG1 Meeting #87, Reno, USA, Nov. 5, 2016, see sections 1-2, 3.2 and figure 1.

Samsung, "Carrier Sensing for UL URLLC Transmissions," R1-1612546, 3GPP TSG RAN WG1 Meeting #87, Reno, USA, Nov. 5, 2016, see section 2.

NTT DOCOMO, Inc., "On Co-existance of eMBB and URLLC," R1-167391, 3GPP TSG RAN WG1 Meeting #86, Gothenburg, Sweden, Aug. 12, 2016, see section 2.

Samsung, "UL URLLC Transmissions," R1-1612545, 3GPP TSG RAN WG1 Meeting #87, Reno, USA, Nov. 5, 2016, see section 2.

ETRI, "Dynamic Resource Sharing between eMBB and URLLC in DL," R1-1612222, 3GPP TSG RAN WG1 Meeting #87, Reno, USA, Nov. 5, 2016, see section 2.2.

R1-1700512: 3GPP TSG RAN WG1, NR Ad-hoc Meeting, Spokane, USA, Jan. 16-20, 2017, LG Electronics, "Discussion on multiplexing of eMBB and URLLC," (10 Pages).

\* cited by examiner

METHOD FOR PERFORMING DATA COMMUNICATION IN WIRELESS COMMUNICATION SYSTEM AND TERMINAL USING SAME METHOD

CROSS-REFERENCE TO RELATED APPLICATIONS

This application is the National Stage filing under 35 U.S.C. 371 of International Application No. PCT/KR2018/001194, filed on Jan. 26, 2018, which claims the benefit of U.S. Provisional Application No. 62/450,569 filed on Jan. 26, 2017, the contents of which are all hereby incorporated by reference herein in their entirety.

BACKGROUND OF THE INVENTION

Field of the Invention

The present invention relates to wireless communication and, more particularly, to a method of performing data communication performed by a terminal in a wireless communication system, a method of providing a device using the same, and a device using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Data communications include data communications having relatively short latency requirements, such as URLLC (Ultra-Reliable and Low Latency Communications), and data communications having relatively long (compared to URLLC) latency requirements, such as enhanced Mobile Broadband (eMBB).

Herein, in the case of the eMBB, since it corresponds to a data communication having a relatively long latency requirement (and/or a relatively low reliability requirement), although the data communication is performed dynamically using a grant via a dynamic DCI (downlink control information), there is relatively little room for problems (than dynamically communicating with the URLLC).

However, in the case of a URLLC corresponding to a data communication having a relatively short latency requirement (and/or a relatively high reliability requirement), in order to dynamically perform data communication, overhead and timeline problems may arise in allocating an UL grant, and attempting an uplink.

Accordingly, the present invention is to provide a method for performing communication through a semi-statically configured resource for data communication having a relatively short latency requirement (and/or a relatively high reliability requirement) and a configuration for a terminal using the method.

SUMMARY OF THE INVENTION

The present invention is to provide a method of performing data communication performed by a terminal in a wireless communication system and a device using the method.

In an aspect, a method for performing a data communication in a wireless communication system is provided. The method may comprise determining a resource configured for data communication having a relatively short latency requirement and performing, on the resource, the data communication having the relatively short latency requirement, and wherein the resource is a semi-statically configured resource.

The data communication having the relatively short latency requirement is an Ultra Reliable and Low Latency Communications (URLLC), and the data communication having a relatively long latency requirement than the data communication having the relatively short latency requirement may be Enhanced Mobile Broadband (EMBB).

The resource may be one of a resource of a first type or a resource of a second type, the first type of resource may be a resource for which puncturing is always applied, the resource of the second type may be a resource to which puncturing is applied depending on whether data communication having the relatively short latency requirement is performed.

In the second type of resource, if the data communication having the relatively short latency requirement is performed, the second type of resource may be punctured, and if the data communication having the relatively short latency requirement is not performed, the second type of resource may be not punctured.

If the channel state is not better than a predetermined threshold value during a specific duration, the terminal may perform data communication with the relatively short latency requirement using the first type resource.

If the channel state is better than a predetermined threshold value during a specific duration, the terminal may perform data communication with the relatively short latency requirement using the first type resource.

The first type of resource may be relatively small in size relative to the second type of resource.

The first type of resource may have a separate reference signal (RS) for the first type of resource.

The terminal may receive information indicating a communication direction of the resource from a network.

The terminal may receive a time duration in which the resource is valid from the network.

The terminal may transmit assistance information related to the resource to the network.

The assistance information may include information indicating how long the terminal will perform the data communication with the relatively short latency requirement for the resource.

The assistance information may include information about whether a parameter for the resource is suitable for data communication having the relatively short latency requirement.

The assistance information may include at least one of release information of the resource or change request information of the resource.

In another aspect, a terminal is provided. The terminal may comprise a radio frequency (RF) unit configured to transmit and receive a radio signal, a processor operably coupled to the RF unit, and wherein the processor configured to determine resource configured for data communication having a relatively short latency requirement and perform, on the resource, the data communication having the relatively short latency requirement, and wherein the resource is a semi-statically configured resource.

In accordance with the present invention, overhead and timeline problems are solved in order to perform data communication with relatively short latency requirements (and/or relatively high reliability requirements) using semi-statically configured resources.

DESCRIPTION OF EXEMPLARY EMBODIMENTS

Figure 1:
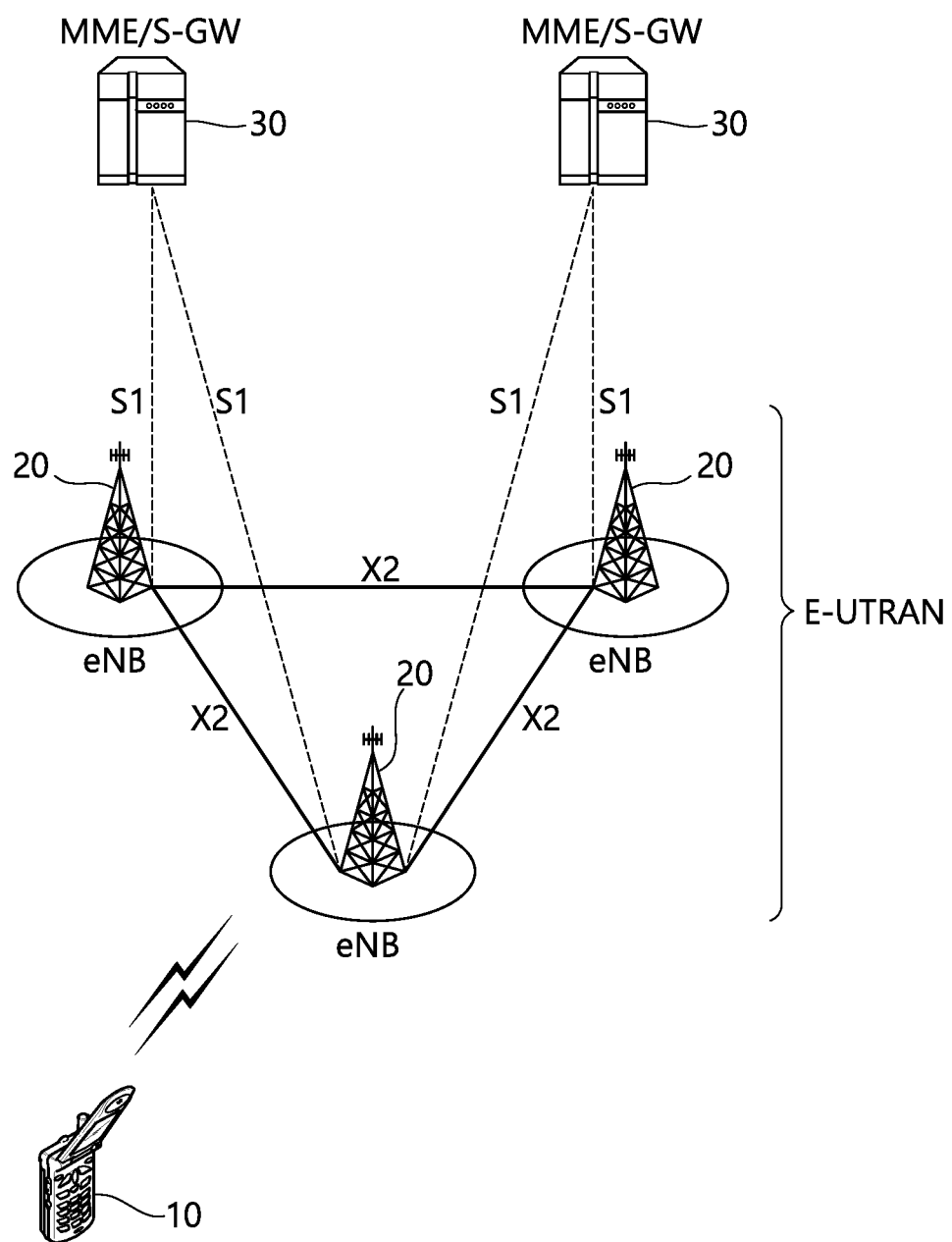
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
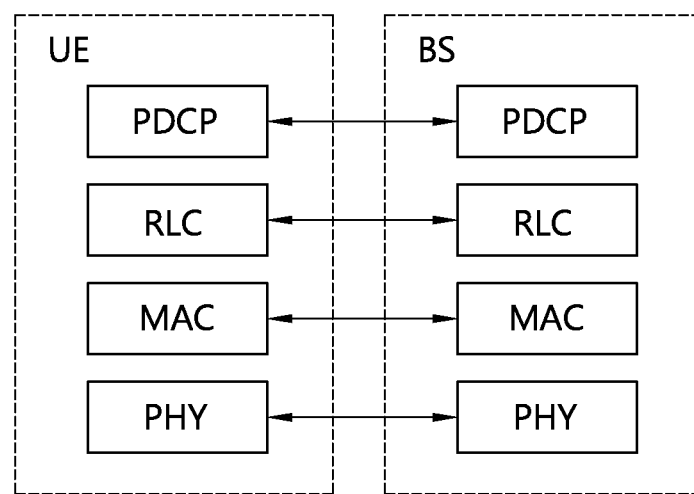
FIG. 2 is a diagram showing a wireless protocol architecture for a user plane.
Figure 3:
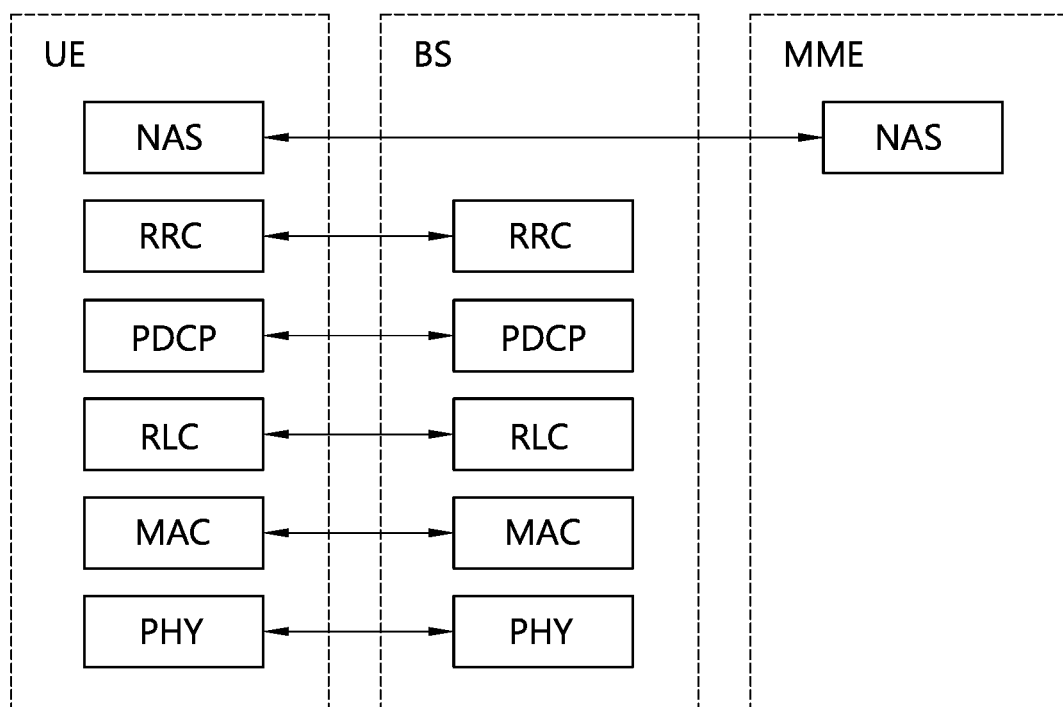
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

<V2X (Vehicle-to-X) Communication>

As described above, in general, the D2D operation may have various advantages in terms of signal transmission/reception between adjacent devices. For example, the D2D terminal has high data rate and low delay and is capable of data communication. In addition, the D2D operation can disperse the traffic to the base station, and can also expand the coverage of the base station if the terminal performing the D2D operation acts as a repeater. Communication related to VEHICLE, including signal transmission/reception between vehicles by the above-mentioned extension of D2D communication, is called V2X (VEHICLE-TO-X) communication in particular.

Herein, for example, in the case of V2X (VEHICLE-TO-X), the term 'X' is used to denote PEDESTRIAN (COMMUNICATION BETWEEN A VEHICLE AND A DEVICE CARRIED BY AN INDIVIDUAL (e.g.) HANDHELD terminal CARRIED BY A PEDESTRIAN, CYCLIST, DRIVER OR PASSENGER)) (V2P), VEHICLE (COMMUNICATION BETWEEN VEHICLES) (V2V), INFRASTRUCTURE/NETWORK (COMMUNICATION BETWEEN A VEHICLE AND A ROADSIDE UNIT (RSU)/NETWORK (e.g.) RSU IS A TRANSPORTATION INFRASTRUCTURE ENTITY (e.g.) AN ENTITY TRANSMITTING SPEED NOTIFICATIONS) IMPLEMENTED IN AN eNB OR A STATIONARY terminal)) (V2I/N) and the like. In addition, for convenience of explanation of the proposed method, for example, a device (related to V2P communication) held by a pedestrian (or a person) is referred to as a "P-terminal", a device (related to V2X communication) installed in VEHICLE is referred to as a "V-terminal." Also, for example, in the present invention, the term 'ENTITY' may be interpreted as P-terminal and/or V-terminal and/or RSU (/NETWORK/INFRASTRUCTURE).

The V2X terminal may perform message (or channel) transmission on a predefined (or signaled) resource pool. Herein, the resource pool may refer to a previously defined resource(s) on which the terminal performs V2X operations (or can perform the V2X operations). In this case, the resource pool may be defined in terms of time-frequency, for example.

Meanwhile, in the V2X, mode 3 corresponds to the scheduling mode by the base station, and mode 4 corresponds to the terminal autonomous scheduling mode. Herein, the terminal according to the Mode 4 may be intended to determine the transmission resource based on the sensing, and then determine that the V2X communication is performed through the determined transmission resource <5G ($5^{th}$ generation)>

In order to meet the increasing demand for wireless data traffic after commercialization of 4G (4th generation) communication systems, efforts are underway to develop improved 5G (5th generation) or pre-5G communication systems. For this reason, a 5G communication system or a pre-5G communication system is referred to as a Beyond 4G Network communication system or a Post LTE (Long Term Evolution) system. In order to achieve a high data rate, 5G communication systems are being considered for implementation in very high frequency (mmWave) bands (e.g., 60 gigahertz (60 GHz) bands). In the 5G communication system, beamforming, massive MIMO, full-dimensional MIMO (FD-MIMO), array antennas, analog beam-forming, and largescale antenna technologies are being discussed in order to mitigate the path loss of the radio wave in the high frequency band and to increase the propagation distance of the radio wave. In addition, in order to improve the network of the system, the 5G system has developed an evolved small cell, an advanced small cell, a cloud radio access network (cloud RAN), an ultra-dense network, Device to Device (D2D) communication, a wireless backhaul, a moving network, cooperative communication, Coordinated Multi-Points (CoMP), interference cancellation and the like. In addition, the 5G system has developed Hybrid Frequency Shift Keying and Quadrature Amplitude Modulation (FQAM), Sliding Window Superposition Coding (SWSC) and the like, as the Advanced Coding Modulation (ACM) scheme, and Filter Bank Multi Carrier (FBMC), Non-Orthogonal Multiple Access (NOMA), Sparse Code Multiple Access (SCMA) and the like, as the Advanced Connection Technology.

Meanwhile, the Internet has evolved into an Internet of Things (IoT) network in which information is exchanged between distributed components such as objects in a human-centered connection network where humans generate and consume information. IoE (Internet of Everything) technology, which combines IoT technology with big data processing technology through connection with cloud servers, is also emerging. In order to implement the IoT, technology elements such as sensing technology, wired/wireless communication, network infrastructure, service interface technology and security technology are required, and in recent years, sensor network, machine to machine (M2M), and Machine Type Communication (MTC). In the IoT environment, an intelligent IT (Internet Technology) service can be provided that collects and analyzes data generated from connected objects to create new value in human life. The IoT can be applied to a field of smart home, smart building, smart city, smart car or connected car, smart grid, health care, smart home appliance, and advanced medical service through fusion of existing information technology.

Accordingly, various attempts have been made to apply the 5G communication system to the IoT network. For example, technologies on sensor network, object communication, and MTC are implemented by techniques such as beamforming, MIMO, and array antennas. The application of the cloud wireless access network as the big data processing technology described above is an example of the convergence of 5G technology and IoT technology.

Fifth-generation (5G) mobile communications, which are expected to be initially commercialized around 2020, are experiencing an increase in momentum recently due to worldwide technical activities on various candidate technologies in industry and academia. Candidate elements of the 5G mobile communication are large antenna technologies ranging from legacy cellular frequency bands to high frequencies to provide beamforming gain and support increased capacity, new waveforms (e.g., new radio access technology (RAT)) to flexibly accommodate various services/applications with diverse requirements, new multiple access schemes to support large scale connections, and the like. Since 2020, the International Telecommunication Union (ITU) were categorized the usage scenarios into three main groups: enhanced mobile broadband (eMBB), large scale machine type communication (MTC), and ultra reliable and low latency (URLL) communications. Also, the ITC has specified the goal requirements such as a maximum data rate of 20 gigabits per second (Gb/s), user experience data rate of 100 megabits per second (Mb/s), triple spectrum efficiency improvement, and up to 500 kilometers per hour (km/h), 1 millisecond (ms) latency, connection density of 106 devices/km$^2$, 100× improvement in network energy efficiency, and region traffic capacity of 10 Mb/s/m$^2$. While not all requirements need to be met at the same time, the 5G network design requires a solution to provide the flexibility to support a variety of applications that meet some of the above requirements, depending on the use case.

<URLLC (Ultra-Reliability Low-Latency Communication) and eMBB (Enhanced Mobile Broad Band)>

Figure 4:
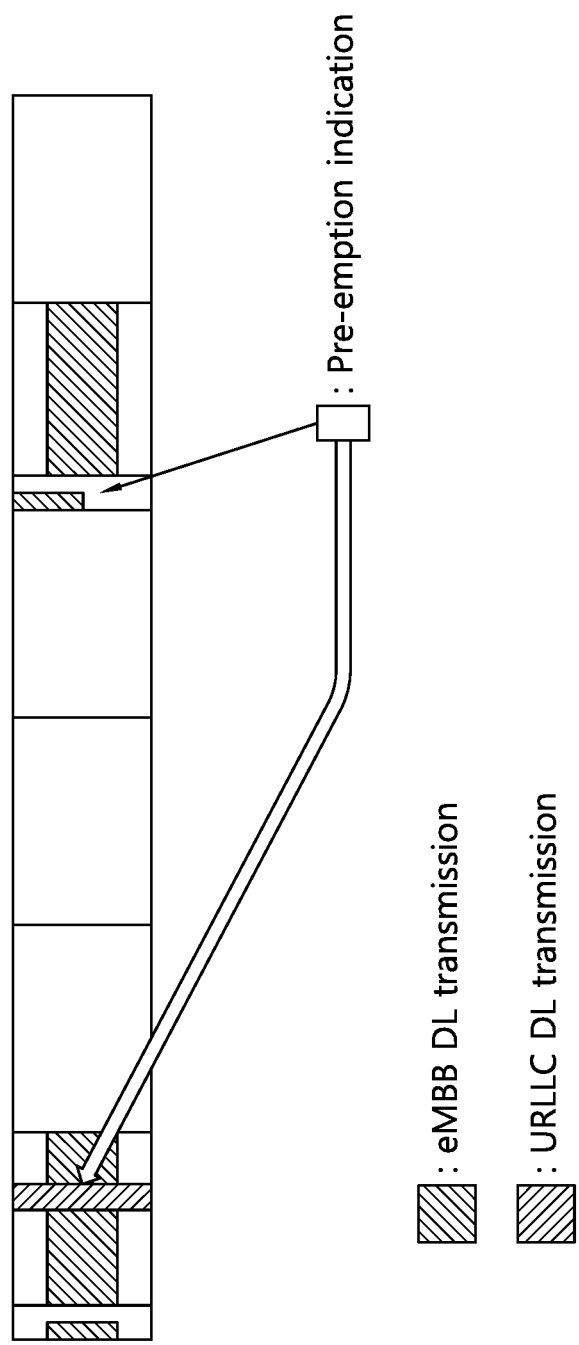
FIG. 4 schematically shows an example of multiplexing of pre-emption-based eMBB and URLLC transmission and pre-emption indication information.

URLLC stands for Ultra-reliability low-latency communication, and it aims at lower block error rate, shorter transmission unit and faster uplink feedback for downlink compared to the enhanced Mobile BroadBand (eMBB) communication. In addition, the URLLC and eMBB communication related transmission features are as follows.

eMBB transmission
Relatively medium to high traffic size
Various range of arrival rate
Relatively long transmission duration (e.g. 1 ms))
URLLC transmission
Relatively low traffic size
Relatively low arrival rate
Extremely low latency requirements (e.g. 0.5, 1 ms)
Relatively short transmission duration (e.g. 2 OFDM symbols)
Urgent service/message FIG. 4 schematically shows an example of multiplexing of pre-emption-based eMBB and URLLC transmission and pre-emption indication information.

The URLLC in Rel-15 NR supports configuration and transmission method on the pre-emption procedure and pre-emption indication in order to support efficient multiplexing between eMBB and URLLC in the downlink.

More specifically, it is assumed that traffic for URLLC occurs intermittently in Rel-15 NR. In this case, the URLLC transmission may occur during transmission for the eMBB.

An operation of taking some resources of another signal that is already being transmitted or scheduled and used for another signal transmission may be described as a pre-emptive procedure, and this allows intermittently occurring URLLC transmissions to be performed without delay through some of the eMBB transmission resources.

In order to improve the detection and decoding performance of a signal in which some information is lost or changed due to another signal, it is necessary to instruct the terminal to recognize the lost and the changed portion so that the corresponding portion can be excluded in decoding.

In the Rel-15 NR, it is supported to transmit the pre-emption indication through the downlink control information that can be received by a plurality of terminals. The pre-emption indication unit may be a code block group including the lost/changed region, a symbol group, or a combination group of a resource block and a symbol.

Figure 5:
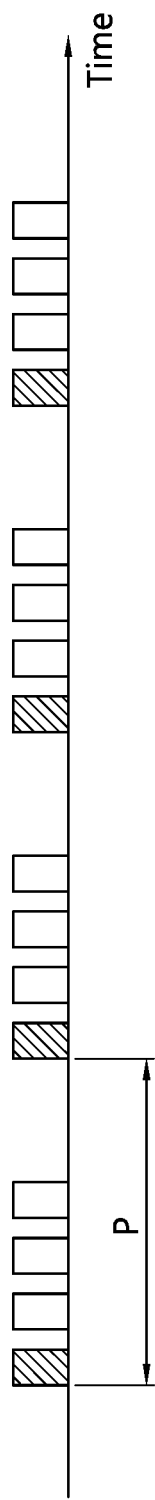
FIG. 5 schematically shows an example of uplink transmission repetition without an uplink grant.

FIG. 5 schematically shows an example of uplink transmission repetition without an uplink grant.

In the Rel-15 NR (New Radio Access Technology), the URLLC supports the uplink transmission of the terminal in the uplink without the indication of the base station. There is a mode for operating in the upper layer configuration and a mode for indicating the uplink transmission activation without uplink grant to the downlink control information after some information is configured in the upper layer.

A plurality of terminals shares the same resource, and uplink transmissions of each other may collide with each other. Therefore, in the Rel-15 NR, an independent reference signal information/time-frequency resource is configured to classify the uplink transmission terminal even in the collision situation.

In order to prevent the delay caused by the retransmission in the collision, it supports repetitive transmission. Information necessary for decoding between the repeated resources is fixed/configured in a transmission period and a repeated transmission order within a transmission period so that the base station can perform decoding by only a part of iterative transmission.

In some embodiments, "subframe" and "time slot" may be used interchangeably. In some embodiments of the invention, the term "subframe" refers to a transmission time duration (TTI), which may include an aggregation of "time slots"

Hereinafter, the present invention will be described.

As described above, data communication includes data communication having a relatively short latency requirement such as URLLC (Ultra-Reliable and Low Latency Communications) and data communication having a relatively low latency requirement such as enhanced Mobile Broadband (eMBB) (compared to URLLC).

Herein, in the case of the eMBB, since it corresponds to a data communication having a relatively long latency requirement (and/or a relatively low reliability requirement), Although dynamic data communication is performed using a grant via dynamic downlink control information (DCI), there is relatively little room for problems (than dynamically communicating with URLLC).

However, in the case of a URLLC corresponding to a data communication having a relatively short latency requirement (and/or a relatively high reliability requirement), in order to dynamically perform data communication, overhead and timeline problems may arise in allocating an UL grant, and attempting an uplink.

Accordingly, the present invention provides a method for performing communication and configurations of the terminal using the method through semi-statically configured resources for data communication having a relatively short latency requirement (and/or a relatively high reliability requirement).

For example, the proposal below proposes a method of efficiently supporting data (/service) communication (e.g., URLLC, V2X) (LLTC_SVC) with relatively short "LATENCY" (and/or a requirement of high "RELIABILITY"), through a (semi-statically) (pre-)configured (/signaled) resources.

Herein, as an example, for the sake of convenience of explanation, a (periodical) resource semi-statically configured (or signaled) (for LLTC_SVC) is referred to as "UR_SPSRSC".

Herein, for example, data (/service) communication (e.g., EMBB) having a relatively long "LATENCY" requirement (and/or a low "RELIABILITY" requirement) (compared to LLTC_SVC) (hereinafter, for convenience of explanation) is named as "HLTC_SVC".

Herein, for example, a resource (dynamically) configured (/signaled) for HLTC_SVC (hereinafter, for convenience of explanation) is named as "EM_DYNRSC".

Herein, for example, the wording of "overlapping" (in the present invention) may be interpreted as the case as (A) where the actual "(all or a portion of) (frequency) resource" overlaps and/or (B) where "the (frequency) resource" is not overlapped and the transmission of two channels (/signals) on the same symbol (or SLOT) is configured, and so on.

Prior to describing specific embodiments of the present invention, for convenience of explanation, the structure of an EMBB, which is one of data (/service) communications having a relatively long "LATENCY" requirement, will be schematically explained.

Figure 6:
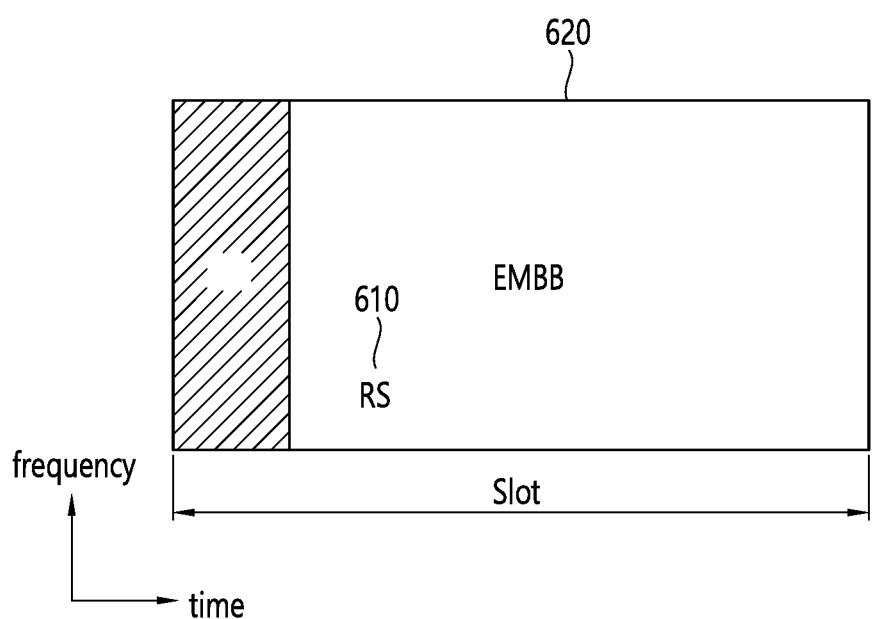
FIG. 6 schematically shows an example of an EMBB structure.

FIG. 6 schematically shows an example of an EMBB structure.

Referring to FIG. 6, the EMBB 620 may be defined in unit of slot in time. In this case, a reference signal (RS) 610 may be placed at the front end of the EMBB 620. In the figure, Although the RS is located at the front end of the EMBB for convenience of explanation, the RS in the EMBB structure according to the present invention does not necessarily have to be located at the front end of the EMBB. In addition, in the EMBB structure according to the present invention, the RS may be additionally located at the middle end of the EMBB, at the rear end or the like (separately from the RS located at the front end).

The structure of the EMBB service illustrated in FIG. 6 is merely an example of various EMBB structures, and does not correspond to a typical channel structure. That is, the structure of the EMBB is not limited to the descriptions described in FIG. 6.

Although the URLLC channel structure is not separately shown, the channel structure of the URLLC may have a relatively small number of symbols constituting the slot (SLOT), as compared with the case of the EMBB channel structure, and thus this is to support the relatively short LATECY.

Hereinafter, an embodiment of the method of efficiently supporting data (service) communication (e.g., URLLC, V2X) (LLTC_SVC) having a relatively short "LATENCY" (and/or a requirement of a high "RELIABILITY", through (semi-statically) (pre-)configured (/signaled) resources will be described with reference to the drawings.

Figure 7:
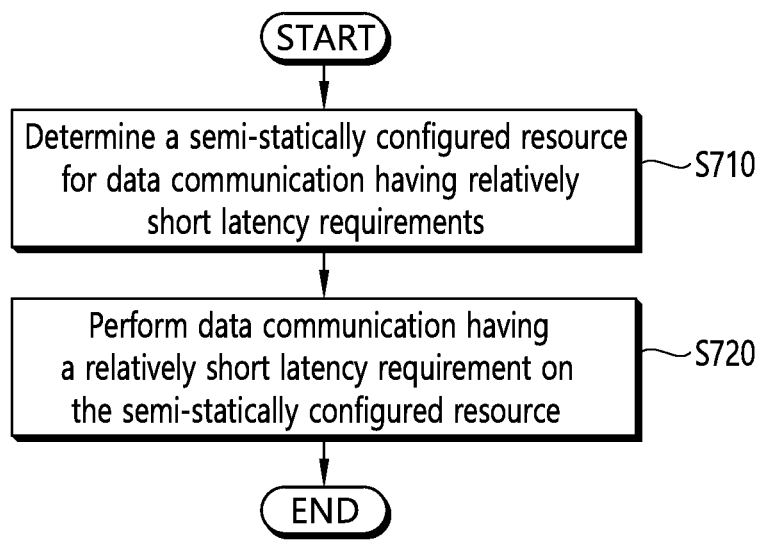
FIG. 7 is a flowchart illustrating a method of supporting data communication having a relatively short latency requirement, according to an embodiment of the present invention.

FIG. 7 is a flowchart illustrating a method of supporting data communication having a relatively short latency requirement, according to an embodiment of the present invention.

Referring to FIG. 7, the base station may configure (/signal) a semi-statically configured resource (e.g., (UL) UR_SPSRSC), for data communication having relatively short latency requirements (S710).

Herein, if a semi-statically configured resource is used for data communication having a relatively short latency requirement, the terminal reduces the (processing) time required for decoding DCI related to data transmission/reception scheduling (received from the base station), and thus the communication can be efficiently supported.

Thereafter, the terminal can perform data communication having a relatively short latency requirement on the resource (S720).

For example, the data communication having the relatively short latency requirement may be Ultra Reliable and Low Latency Communications (URLLC), and the data communication having a relatively long latency requirement may be Enhanced Mobile Broadband (EMBB).

For example, the resource is one of a first type resource and a second type resource, the first type resource may be a resource to which puncturing (or rate matching) is always applied, and the second type may be a resource to which puncturing (or rate matching) is applied depending on whether data communication having the relatively short latency requirement is performed.

In this case, for example, in the second type resource, if the data communication having the relatively short latency requirement is performed, the second type resource is punctured (or rate matched), and if data communication having the short latency requirements is not performed, the second type of resource may not be punctured (or rate matched).

For example, the first type resource may have a relatively small size as compared with the second type resource. For example, in order to mitigate performance degradation due to the puncturing (or rate matching) always-applied, in the case of type 1, the semi-statically configured resources of relatively small size compared to the type 2 can be allocated.

For example, in the case of the second type, a reference signal (RS) may not additionally (or independently) be configured on the semi-statically configured resource. In addition, in the case of the first type, a separate reference signal may be configured on the semi-statically configured resource.

For example, the terminal may receive information indicating a communication direction of the resource from a network.

For example, the terminal may receive a time duration in which the resource is valid from the network.

For example, the terminal may transmit assistance information related to the resource to the network.

Herein, the assistance information may include information indicating, for a certain time period, whether the terminal will perform data communication with the relatively short latency requirement. In this case, the auxiliary information may include information on whether the parameter for the resource is suitable for data communication having the relatively short latency requirement. In this case, the auxiliary information may include at least one of release information of the resource or change request information of the resource.

Hereinafter, specific examples of a method for supporting data communication having a relatively short latency requirement will be described below for convenience of explanation.

Hereinafter, a method in which a terminal divides a semi-statically configured resource into two types for data communication having a relatively short latency requirement and performs wireless communication will be described. For example, the two types of semi-statically configured resources (e.g., resources of the first type and resources of the second type) may be categorized depending on protecting data communications having short latency requirements to a certain level/priority.

[Proposed Method #1]

For example, (UL) UR_SPSRSC may be specified (/signaled) for each pre-configured (signaled) frequency resource (region) and the following (some) rules may be applied on each (UL) UR_SPSRS.

Example #1-1

For example, a pre-configured (UL) UR_SPSRSC may categorized a resource type (RG_TYPE #A) that puncturing (or rate matching) for the (UL) UR_SPSRSC is always applied (regardless of its actual LLTC_SVC transmission (and/or using (UL) UR_SPSRSC)) and/or (B) the actual LLTC_SVC transmission (and/or UL UR_SPSRSC use) or a resource type (RG_TYPE #B) that applies puncturing (or rate matching) differently, depending on whether its actual LLTC_SVC is transmitted or not (and/or the (UL) UR_SPSRSC) is used or not.

Herein, for example, in the case of RG_TYPE #B, the puncturing (or rate matching) for the (corresponding) (UL) UR_SPSRSC can be applied, only if the LLTC_SVC transmission is actually performed (and/or the UL UR_SPSRSC is used).

Herein, for example, the RG_TYPE #A allows a terminal that performs only LLTC_SVC transmission (without the HLTC_SVC transmission) (UL) UR_SPSRSC (on the same (SLOT) time (and/or the overlapped frequency resource)) to use the (corresponding) (UL) UR_SPSRSC (in a limited manner) and/or the RG_TYPE # B allows a terminal that simultaneously performs the HLTC_SVC transmission and the LLTC_SVC transmission (on the same (SLOT) time (and/or overlapping frequency resources)) to use the (corresponding) (UL) UR_SPSRSC (in a limited manner).

Herein, for example, a different RS resource (for example, (in case of ZADOFF-CHU SEQUENCE) CYCLIC SHIFT (and/or ROOT INDEX), (antenna) port, etc.) can be configured (/signaled) between terminals using the RG_TYPE #A, so that efficient multiplexing can be performed. Herein, for example, the (corresponding) RS resource allocation (/signaling) may be performed via (UL) UR_SPSRSC ACTIVATION DCI (or higher layer signaling (e.g., RRC)).

Example #1-2

For example, the (UL) UR_SPSRSC size between RG_TYPE #A and RG_TYPE #B may be configured differently (/signaling) when (the (Example #1-1) is applied).

Herein, as described above, since RG_TYPE #A and/or RG_TYPE #B are resources for which puncturing can be performed, they may directly affect the performance of the EMBB. Particularly, since the RG_TYPE #A is punctured unconditionally, if the size of RG_TYPE #A is larger than RG_TYPE #B, there is a problem that the loss of EMBB is relatively increased.

In order to solve the above problem, herein, for example, in the case of RG_TYPE#A (to mitigate performance degradation due to the puncturing (or rate matching) always applied), the (UL) UR_SPSRSC with a relatively small size can be allocated (/signaled) (compared to the RG_TYPE#B).

Example #1-3

For example, in the case of RG_TYPE #B, the RS may not be additionally (or independently) configured on the (UL) UR_SPSRSC.

Herein, for example, in such a case, the LLTC_SVC decoding channel estimation may be performed on the HLTC_SVC related (UL) EM_DYNRSC RS transmitted on the same (SLOT) time point (and/or overlapped frequency resource).

Herein, for example, if the LLTC_SVC transmission is performed in the (UL) UR_SPSRSC included in (UL) EM_DYNRSC, the application of the corresponding rule may be interpreted as an RS (transmission) on the (UL) UR_SPSRSC as being optional.

Herein, for example, if the LLTC_SVC transmission is performed on the (RG_TYPE #B) (UL) UR_SPSRSC, then a pre-configured (/signaled) independent scrambling different from the case of HLTC_SVC transmission on (UL) EM_DYNRSC (e.g., to allow the base station to facilitate blind detection for the LLTC_SVC transmission of the terminal) based on a seed value (e.g., RNTI, (CELL) ID) can be applied.

Herein, for (opposite) example, in the case of RG_TYPE #B, the RS may be additionally (or independently) configured on (UL) UR_SPSRSC.

As another example, (on the other hand) in the case of RG_TYPE #A (in particular, when the LLTC_SVC transmission is performed without HLTC_SVC transmission (on the same SLOT time point (and/or overlapping frequency resources)), the RS on the UR_SPSRSC can additionally (or independently) be configured.

Hereinafter, for convenience of understanding, an embodiment of the proposed method #1 will be described with reference to the drawings.

Figure 8:
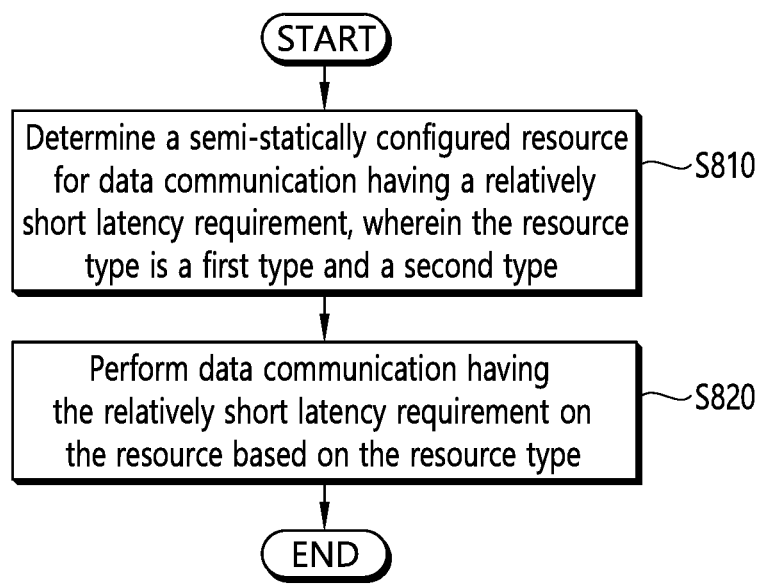
FIG. 8 is a flowchart for an example of a method for supporting data communication having a relatively short latency requirement according to the proposed method #1.

FIG. 8 is a flowchart for an example of a method for supporting data communication having a relatively short latency requirement according to the proposed method #1.

Referring to FIG. 8, a terminal can determine a semi-statically configured resource for data communication having a relatively short latency requirement (S810). The type of the resource may be a first type or a second type.

For example, the first type may mean a resource type (RG_TYPE#A) (or type A) that the puncturing (or rate-matching) for the (UL) UR_SPSRSC should be always applied (regardless of its actual LLTC_SVC transmission (and/or using UL UR_SPSRSC). Further, the second type may mean a resource type (RG_TYPE#B) (or type B) that the puncturing (or rate-matching) for the (UL) UR_SPSRSC is applied differently, depending on whether the actual LLTC_SVC transmission is transmitted or not (and/or the (UL) UR_SPSRSC used or not), described in the above Example #1-1.

Thereafter, the terminal can perform data communication having the relatively short latency requirement on the resource based on the resource type (S820).

Hereinafter, for convenience of the proposed method #1, an example where the RG_TYPE #A and the RG_TYPE #B are located in the EMBB slot will be described with reference to the drawings.

Figure 9:
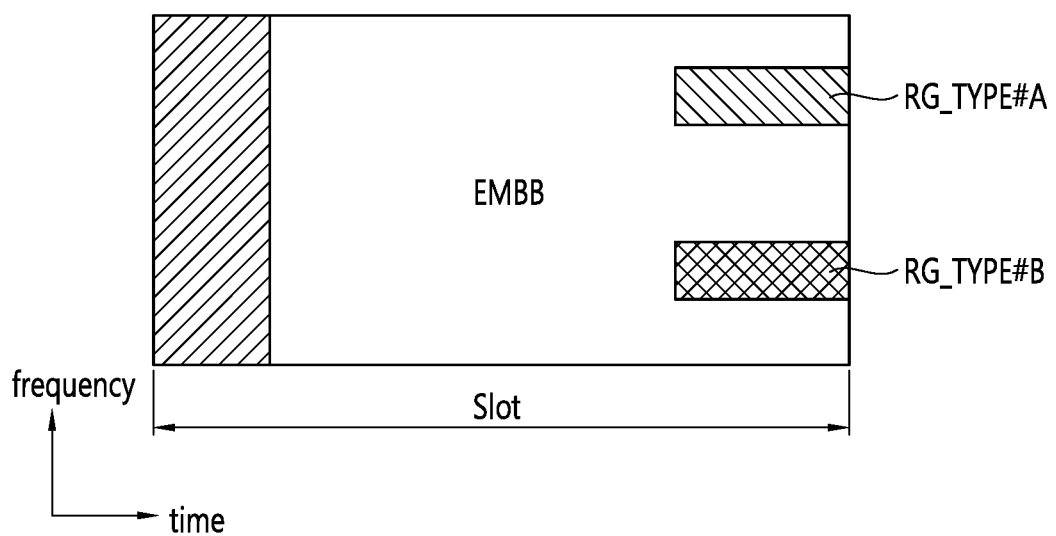
FIG. 9 is a diagram schematically showing an example in which resources of RG_TYPE #A and resources of RG_TYPE #B are located in the EMBB region.

FIG. 9 is a diagram schematically showing an example in which resources of RG_TYPE #A and resources of RG_TYPE #B are located in the EMBB region.

Referring to FIG. 9, resources of the RG_TYPE #A and resources of the RG_TYPE #B can be located on the EMBB resource region. Herein, a resource of RG_TYPE #A may mean a resource of the first type, and a resource of RG_TYPE #B may mean a resource of the second type.

Herein, the resources of the first type (i.e., RG_TYPE #A) are relatively higher in level/priority than the resources of the second type (i.e., RG_TYPE #B) and it may correspond to the resource for protecting the operation of the terminal(s) performing the URLLC operation.

As described above, although the execution of the EMBB operation is configured on the resource of the first type, the terminal always punctures (or rate-matches) the resource of the first type.

Accordingly, if another terminal performs communication for the URLLC on the first type resource, it is possible to protect the operation and it is possible to stably support data (/service) communication (e.g., URLLC, V2X) (LLTC_SVC) with a relatively short "LATENCY" (and/or a requirement of high "RELIABILITY").

Herein, the resource of the second type (i.e., RG_TYPE #B) may be a resource that is punctured (or rate-matched) only if the actual URLLC operation is performed, as described above. That is, if the actual URLLC operation is not performed, the puncturing (or rate matching) is not performed on the resource, and the EMBB data can be overridden.

Accordingly, since the resource of the second type can be affected by a grant detection error (related to the EMBB data scheduling), the protection for the URLLC can be relatively less than that of the first type resource. However, since the data for the URLLC can be adaptively transmitted or the data for the EMBB can be adaptively transmitted on the second type of resource, the utilization efficiency of the radio resource can be increased more than that of the first type resource.

In the previously described FIG. 9, the configuration in which a resource of the RG_TYPE #A (or resource of the first type) and a resource of the RG_TYPE #B (or resource of the second type) are located on an EMBB (scheduling). However, the resource of the RG_TYPE #A (or the resource of the RG_TYPE #B) does not necessarily have to be located on the EMBB (scheduling) resource region (i.e., the resource of RG_TYPE #A may be outside of the (scheduling) resource region of the EMBB). This will be described below with reference to the drawings.

Figure 10:
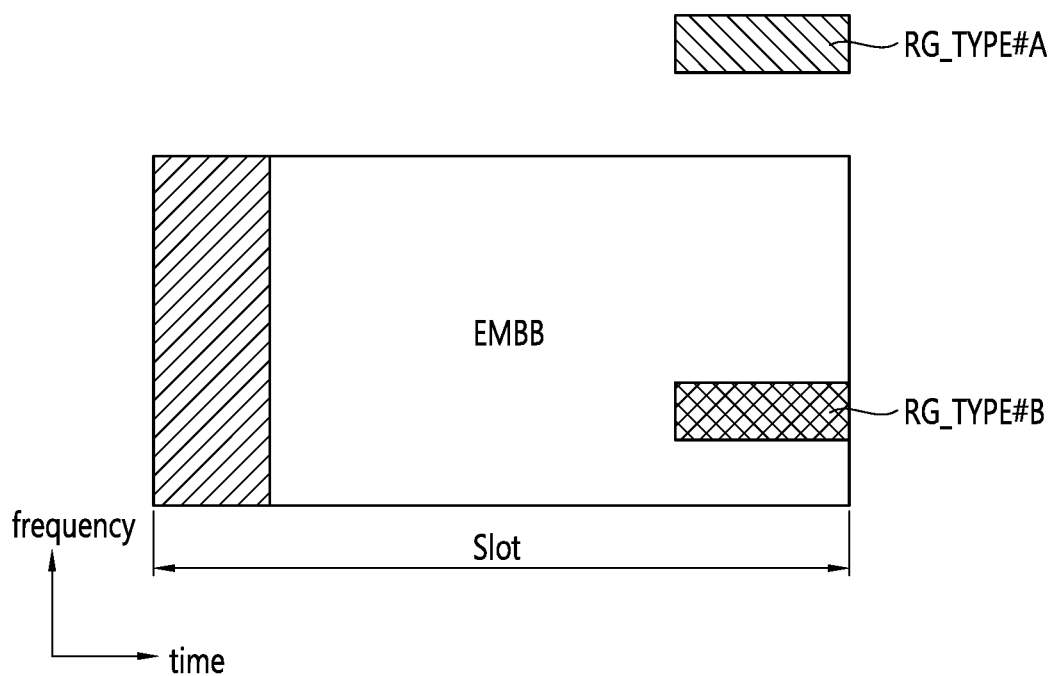
FIG. 10 is a schematic diagram illustrating an example in which resources of RG_TYPE #A are located outside an EMBB (scheduling) resource region.

FIG. 10 is a schematic diagram illustrating an example in which resources of RG_TYPE #A are located outside an EMBB (scheduling) resource region.

Referring to FIG. 10, the resource of RG_TYPE #A may be located outside the (scheduling) resource region of the EMBB, as shown in the figure. Herein, the resource of RG_TYPE #A may mean a resource of the first type, and the resource of RG_TYPE #B may mean a resource of a second type.

As such, since the resource of the first type (i.e., RG_TYPE #A) can be located outside the (scheduling) resource region of the EMBB, there may be a separate reference signal (RS) for the first type resource.

As shown in FIG. 10, a reference signal for the resource of the first type may be separately configured for the resource of the first type. Furthermore, as described in Examples #1-3, the reference signal for the resource of the second type can also be configured separately.

However, in the case of the resource of the second type, a separate reference signal is not necessarily configured, and a channel estimation is possible for the resource of the second type using the reference signal used in the EMBB. This will be described below with reference to the drawings.

Figure 11:
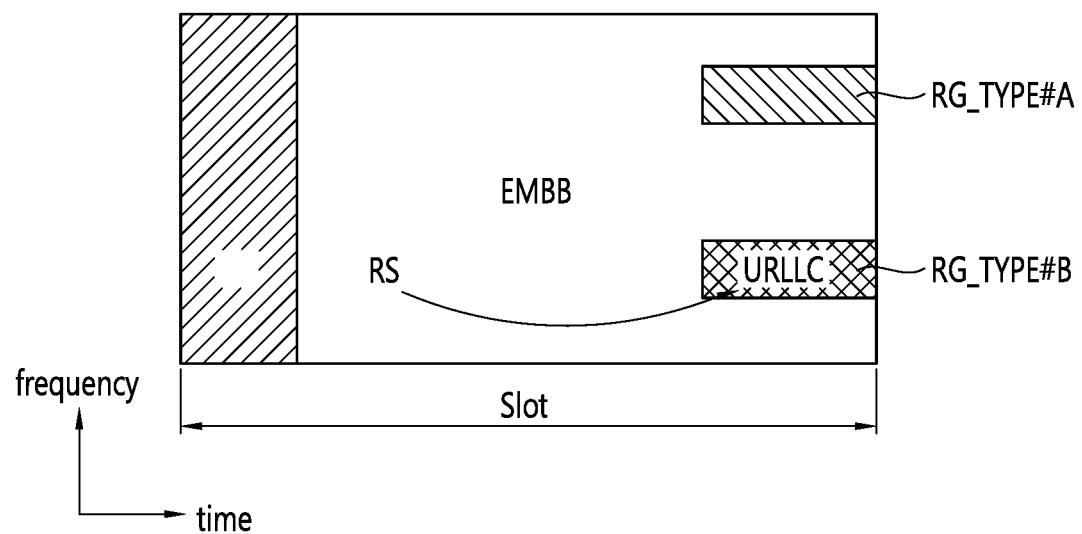
FIG. 11 is an example schematically showing an example in which a reference signal for an EMBB is used by resources of RG_TYPE #B.

FIG. 11 is an example schematically showing an example in which a reference signal for an EMBB is used by resources of RG_TYPE #B.

According to FIG. 11, for example as described in Examples #1-3, the LLTC_SVC decoding channel estimation may be implemented with the HLTC_SVC related (UL) EM_DYNRSC RS transmitted on the same (SLOT) time point (and/or overlapped frequency resource). The details of this are the same as those described above, so a detailed description thereof will be omitted.

As described above, the terminal can support data communication (for example, URLLC) having a relatively short latency requirement using the resources of RG_TYPE #A and/or resources of RG_TYPE #B. Hereinafter, RG_TYPE #A may be referred to as a first type, and RG_TYPE #B may be referred to as a second type for convenience of explanation.

Hereinafter, an embodiment in which a first type resource is configured, an embodiment in which a second type resource is configured, and an embodiment in which both the first type resource and the second type resource are configured, respectively.

Figure 12:
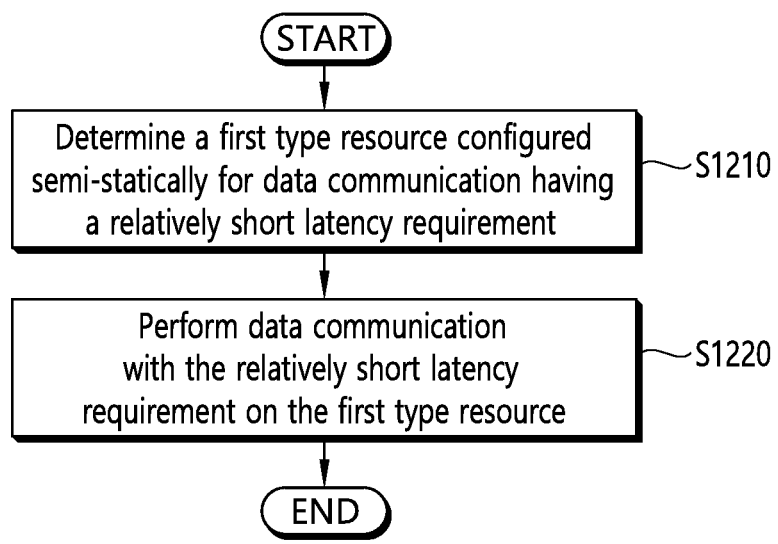
FIG. 12 is a flowchart of another example of a method for supporting data communication having a relatively short latency requirement according to the proposed method #1.

FIG. 12 is a flowchart of another example of a method for supporting data communication having a relatively short latency requirement according to the proposed method #1.

Referring to FIG. 12, a terminal may determine a first type resource configured semi-statically for data communication having a relatively short latency requirement (S1210).

Thereafter, the terminal may perform data communication with the relatively short latency requirement on the first type resource (S1220).

As described above, if the terminal performs the data communication using the first type resource, for example, the URLLC can be protected with a relatively high level/priority. Herein, the specific details of the first type resource and the specific details of the terminal performing wireless communication on the first type resource are as described above.

Figure 13:
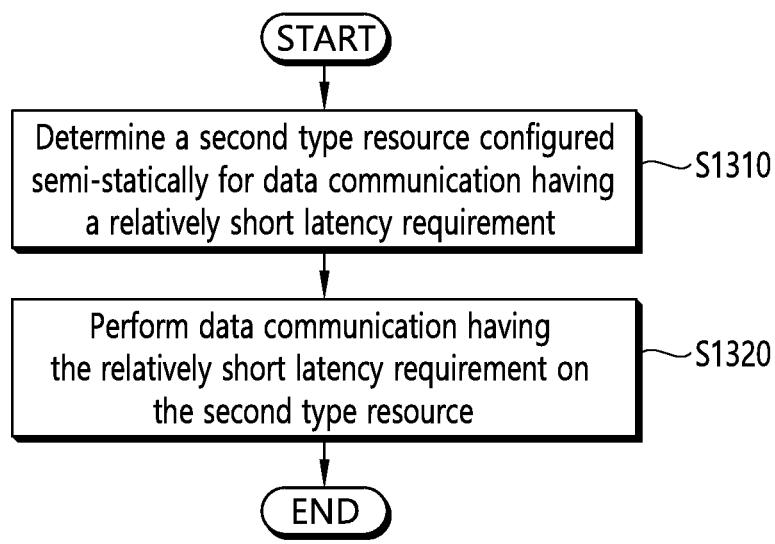
FIG. 13 is a flowchart of another example of a method for supporting data communication having a relatively short latency requirement according to the proposed method #1.

FIG. 13 is a flowchart of another example of a method for supporting data communication having a relatively short latency requirement according to the proposed method #1.

Referring to FIG. 13, a terminal can determine a second type resource configured semi-statically for data communication having a relatively short latency requirement (S1310).

Thereafter, the terminal can perform data communication having the relatively short latency requirement on the second type resource (S1320).

In this manner, if the terminal performs the data communication using the second type resource, the second type resource is punctured only when data communication having a relatively short latency requirement is actually performed, and in other cases, data communication (e.g., EMBB) having a relatively long latency on the second resource can be performed, so that the radio resource utilization efficiency can be increased. Herein, the specific details of the second type resource and the specific details of the terminal performing wireless communication on the second type resource are as described above.

FIG. 12 mainly illustrates a case where a first type resource is configured, and FIG. 13 mainly illustrates a case where a second type resource is configured. However, this does not necessarily mean that the terminal should use only the first type resource, or that the terminal should use only the second type resource. That is, the terminal may perform data communication using both the first type resource and the second type resource. Hereinafter, an example of performing data communication using resources of a first type and resources of a second type will be described with reference to the drawings.

Figure 14:
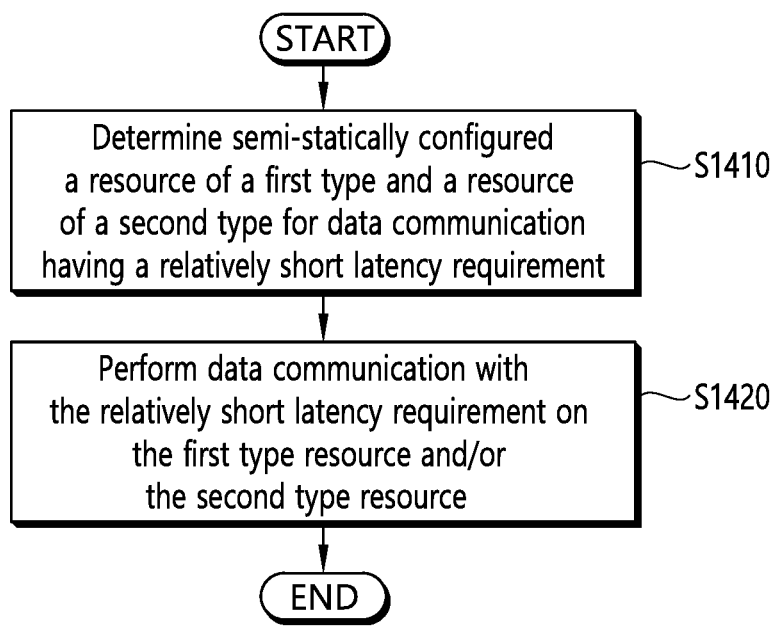
FIG. 14 is a flowchart of another example of a method of supporting data communication having a relatively short latency requirement according to the proposed method #1.

FIG. 14 is a flowchart of another example of a method of supporting data communication having a relatively short latency requirement according to the proposed method #1.

Referring to FIG. 14, a resource of a first type and a resource of a second type may be determined semi-statically configured for data communication having a relatively short latency requirement (S1410).

Thereafter, the terminal can perform data communication with the relatively short latency requirement on the first type resource and/or the second type resource (S1420). Herein, a specific description of the first type resource and the second type resource and a specific example in which the terminal performs wireless communication using the first type resource and/or the second type resource are as described above.

Hereinafter, in addition to the above-mentioned descriptions, additional configurations for supporting data communication with relatively short latency requirements more efficiently will be described.

[Proposal Method #2]

For example, UR_SPSRSC is (pre-)configured (/signaled), and the (actual) usage (/communication direction) (e.g., DL/UL UR_SPSRSC) of the (corresponding) UR_SPSRSC may be assigned via and additional signaling (e.g., DCI).

Herein, for example, when the corresponding rule is applied, (A) DL UR_SPSRSC and UL UR_SPSRSC are configured in the form of "INTERLACING" (on the time axis) (for example, in the form of the (LLTC_SVC related) HARQ FEEDBACK transmission/reception, and/or (B) the (actual) usage (/direction of communication) of UR_SPSRSC may be dynamically changed (by the base station), depending on the DL/UL LLTC_SVC load (ratio). As another example, the DL UR_SPSRSC and the UL UR_SPSRSC may be (pre-)configured (/signaled) in the form of "INTERLACING" (on the time axis).

Hereinafter, for convenience of understanding, embodiments of the proposed method #2 will be described with reference to the drawings.

Figure 15:
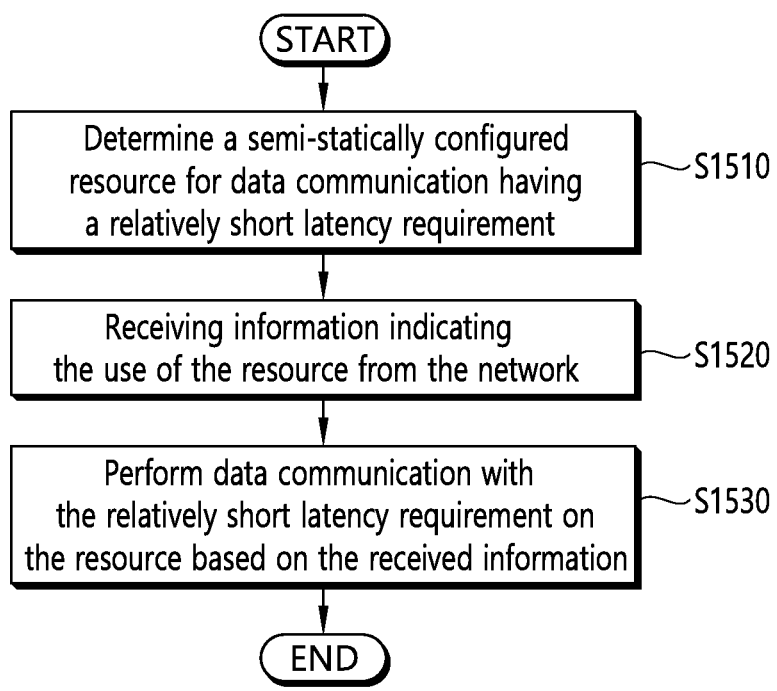
FIG. 15 is a flowchart of an example of a method of supporting data communication having a relatively short latency requirement according to the proposed method #2.

FIG. 15 is a flowchart of an example of a method of supporting data communication having a relatively short latency requirement according to the proposed method #2.

Referring to FIG. 15, a terminal can determine a semi-statically configured resource for data communication having a relatively short latency requirement (S1510). Herein, a detailed description of data communication having a relatively short latency requirement and the descriptions of the resource are as described above.

The terminal may receive information indicating the use of the resource from the network (S1520).

In the new radio access technology (NR), uplink and downlink can be all configured on one slot. That is, in NR, the slot structure can be variably changed, and accordingly the terminal additionally receives information specifying the (actual) use (/communication direction) (e.g., the DL/UL UR_SPSRSC) of the UR_SPSRSC, thereby capable of performing variable uplink and/or downlink communication.

Thereafter, the terminal may perform data communication with the relatively short latency requirement on the resource based on the received information (S1530). Since a specific example of the terminal performing the data communication with the relatively short latency requirement on the resource is as described above, the redundant description is omitted.

[Proposed Method #3]

For example, a base station may inform a terminal of whether the UR_SPSRSC is valid or not during the (pre-)configured (/signaled) "TIME DURATION (/WINDOW)", through a predefined (physical layer/upper layer) signalling.

Herein, for example, when the corresponding rule is applied, the terminal performs the LLTC_SVC transmission/reception operation (/procedure) (for example, LLTC_SVC reception related control channel blind detection) only on the valid UR_SPSRSC.

[Proposed Method #4]

For example, the terminal may report to the base station (some) "ASSIST INFORMATION" below associated with the (previously (or currently) configured (or signaled)) (UL) UR_SPSRSC.

Herein, for example, when a plurality of (UL) UR_SPSRSCs are configured (/signaled) to (the terminal), the "ASSIST INFORMATION" may be generated/reported for each UL UR_SPSRSC.

Herein, for example, a base station receiving the "ASSIST INFORMATION" from a specific terminal (finally) determines/performs the "UR_SPSRSC RECONFIGURATION (/REACTIVATION) (e.g., period, subframe offset, RB number, MCS)" related to the corresponding (specific) terminal and/or (UL) UR_SPSRSC RELEASE" and the like.

Herein, for example, the (corresponding) "ASSIST INFORMATION" may be configured to be transmitted via the (previously (or currently) configured (/signaled) (UL) UR_SPSRSC (or the resource configured (/signaled) (previously) independently (or additionally) with the corresponding usage.

Example #4-1

As an example, information on how long the terminal will perform the LLTC_SVC transmission operation for the (UL) UR_SPSRSC that has been previously (or currently) configured (or signaled).

That is, the terminal can transmit information on how much the URLLC data uplink transmission is performed on the resource. If the network is informed that the terminal is no longer performing uplink transmission through the information sent by the terminal, the network may configure the resource to another terminal. Alternatively, the terminal may use the resources for EMBB purposes.

Example #4-2

For example, information on parameters such as the (UL) UR_SPSRSC related period/sub-frame offset/RB count/MCS configured previously (or currently) (or signaled) suitable for the (current) LLTC_SVC transmission by the terminal (and/or information on parameters such as (UL) UR_SPSRSC related (ESTIMATED) period/subframe offset/RB number/MCS suitable for (current) LLTC_SVC transmission of the terminal and/or ((current) LLTC_SVC transmission related) (ESTIMATED) packet size) of the terminal.

That is, the terminal can transmit the fitness information as shown in an example #4-2. If the network is informed that the resource configured by the network is misaligned through the information sent from the terminal, the network can re-configure the resource.

Example #4-3

For example, a request to change (UL) UR_SPSRSC (configuration) information and/or (specific) (UL) UR_SPSRSC (related) and/or (UL) UR_SPSRSC related RELEASE request and/or (UL) UR_SPSRSC (configuration) that is not valid (any more) to the terminal Hereinafter, for convenience of understanding, embodiments of the proposed method #4 will be described with reference to the drawings.

Figure 16:
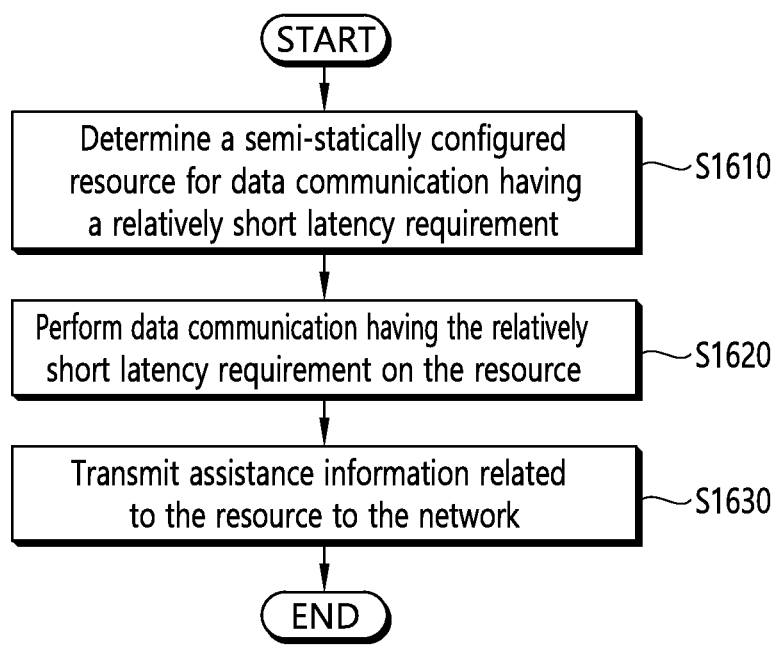
FIG. 16 is a flowchart illustrating an example of a method of supporting data communication having a relatively short latency requirement, according to the proposed method #4.

FIG. 16 is a flowchart illustrating an example of a method of supporting data communication having a relatively short latency requirement, according to the proposed method #4.

Referring to FIG. 16, a terminal may determine a semi-statically configured resource for data communication having a relatively short latency requirement (S1610).

The data communication having the relatively short latency requirement may be performed on the resource (S1620). Herein, since the details of the resource is as described above, the description of the redundant description is omitted for convenience of explanation.

Thereafter, the terminal can transmit assistance information related to the resource to the network (S1630). Herein, since the assistance information transmitted by the terminal is as described in the proposed method #4, the description of the redundant description is omitted for convenience of explanation.

In another example, the base station may (pre-)configure (/signal) a plurality of (semi-static) (periodical) uplink resource (e.g., (UL) UR_SPSRSC) related to the LLTC_SVC on a frequency (/time) region, to a specific terminal, and may inform whether any of the resource is valid to that terminal (through a predefined (physical layer/upper layer) signaling).

For example, the base station configures may (pre-)configure (/signal) a plurality (semi-static) (periodic) uplink resources (e.g., UL UR_SPSRSC) related to LLTC_SVC through the DCI on a frequency (/time) region, and may inform whether any of the resource is valid to that terminal (through a RRC signaling).

Herein, for convenience of explanation (for the proposed scheme), the situation is assumed that the base station configures (or signals) a plurality of (uplink) frequency resources (related to LLTC_SVC) over two symbols, to a specific terminal.

Herein, for example, in this case, it is assumed that that terminal uses the (uplink) frequency resource only on the first symbol for the LLTC_SVC related SR transmission, on the valid resource (which is additionally configured (/signaled) from the base station), and uses the (uplink) frequency resource is used over the first/second symbol for the LLTC_SVC related DATA transmission.

Herein, for example, (A) if that terminal should simultaneously perform the LLTC_SVC related SR transmission and the HLTC_SVC related DATA transmission, then it may be configured to perform the LLTC_SVC related SR transmission on the (LLTC_SVC related) (uplink) frequency resource on the first symbol and to perform the HLTC_SVC related DATA transmission and perform the LLTC_SVC related SR transmission on the (LLTC_SVC related) (uplink) frequency resource on the second symbol, and/or (B) if that terminal performs only the LLTC_SVC related data transmission (on a valid resource) (for example, the HLTC_SVC related DATA transmission is not performed (simultaneously), then it may be configured to repeatedly transmit the LLTC_SVC related SR on the (LLTC_SVC related) (uplink) frequency resource on the first/second symbol.

As another example, in the case of the LLTC_SVC related downlink (semi-static) (periodic) communication, only in the case of ACK (by the terminal), the terminal may be configured to perform PUCCH (SYMBOL) transmission (according to the pre-configured HARQ timeline).

Herein, for example, when the corresponding rule is applied, when the base station does not perform the downlink transmission related to the LLTC_SVC, the resource including the (associated) PUCCH (SYMBOL) may be used to be changed for the downlink purpose.

For example, the terminal may perform the PUCCH transmission only in the case of ACK, and may not perform the PUCCH transmission in the case of NACK. Herein, in case of NACK, since the terminal does not perform the above PUCCH transmission, the network can use the resource to which the above PUCCH transmission should have been performed as a resource for downlink. Accordingly, according to the present embodiment, since the radio resources can be used flexibly, the use efficiency of the radio resources can be increased.

In another example, when UL UR_SPSRSC and UL EM_DYNRSC are "FDM" (on the same SLOT), "GUARANTEED POWER" for the LLTC_SVC related transmission on the UL UR_SPSRSC and (and/or (transmission) power ratio value between the transmission on the UR_SPSRSC and the transmission on the UL EM_DYNRSC) may be configured (/signaled). Herein, for example, whether or not that GUARANTEED POWER (and/or (transmission) power ratio value) is applied may vary depending on whether or not the LLTC_SVC transmission on the (actual) UL UR_SPSRSC is transmitted. Herein, for example, when the DL UR_SPSRSC and the DL EM_DYNRSC are "FDM" (on the same SLOT), data (transmission) power ratio on the symbol on which (A) that RS is not transmitted and/or (B) the data transmission (power) ratio on the symbol on which (B) that RS is transmitted over the pre-configured (signaled) RS power and the like may be independently configured (/signaled) (between the DL UR_SPSRSC and the DL EM_DYNRSC). Herein, for example, when the above-described rule is applied, the MCS for the transmission on the (UL/DL) UR_SPSRSC and transmission on the (UL/DL) EM_DYNRSC may be configured (/signaled) differently.

It is obvious that examples of the proposed method described above can also be included as one of the implementation methods of the present invention, and thus can be considered as a kind of proposed methods. In addition, the proposed schemes described above may be implemented independently, but may be implemented by a combination (or incorporation) of some of the proposed schemes. For example, the scope of the system to which the proposed scheme of the present invention is applied may be extended to other systems than the 3GPP LTE system. For example, the proposed schemes of the present invention can be extended even when the LLTC_SVC is performed through dynamically allocated resources and/or when the HLTC_SVC is performed through (semi-statically) configured (/signaled) (periodical) resources.

Figure 17:
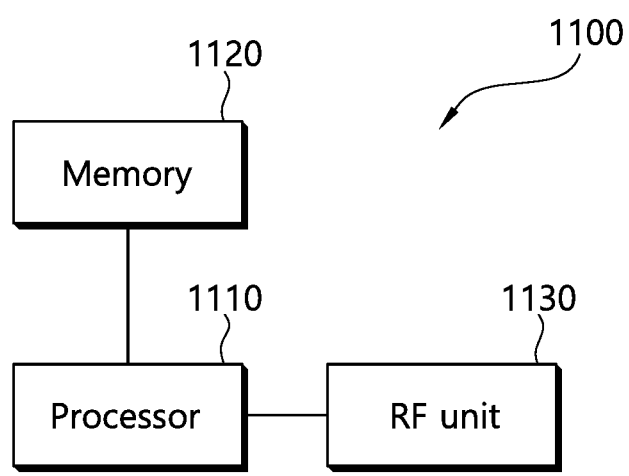
FIG. 17 is a block diagram illustrating a terminal in which an embodiment of the present invention is implemented.

FIG. 17 is a block diagram illustrating a terminal in which an embodiment of the present invention is implemented.

Referring to FIG. 17, a terminal 1100 includes a processor 1110, a memory 1120, and an RF unit (radio frequency unit) 1130.

According to one embodiment, the processor 1110 may implement the functions/operations/methods described by the present invention. For example, the processor 1110 may be configured to determine resources configured for data communication with relatively short latency requirements, and to perform data communication with the relatively short latency requirements on the resources. In this case, the resource may be a semi-statically configured resource.

The RF unit 1130 is coupled to the processor 1110 to transmit and receive radio signals.

The processor may include Application-Specific Integrated Circuits (ASICs), other chip sets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In addition, the definition of the terms described above can refer to and include the terms of the 3GPP, TS 36 series, and TS 38 series standard specifications.

What is claimed is:

1. A method performed by a user equipment (UE) in a wireless communication system, the method comprising:
   determining resources that are semi-statically configured for a first data communication; and
   performing, on at least one of the resources, the first data communication,
   wherein the first data communication has a relatively short latency requirement compared to a latency requirement of a second data communication,
   wherein, in case the first data communication is performed, puncturing a resource for the data communication is performed, and
   wherein, in case the first data communication is not performed, puncturing a resource for the data communication is not performed.

2. The method of claim 1,
   wherein the first data communication having the relatively short latency requirement, compared to the second data communication, is an ultra reliable and low latency communication (URLLC), and
   wherein the second data communication having a relatively long latency requirement compared to the first data communication is enhanced mobile broadband (EMBB).

3. The method of claim 1,
   wherein the resources comprise at least one of first type of resource or second type of resource,
   wherein the first type of resource is a resource for which puncturing is always applied, and
   wherein the second type of resource is a resource to which puncturing is applied depending on whether data communication having a relatively short latency requirement is performed.

4. The method of claim 3, wherein the first data communication is performed using the first type of resource, based on a channel state not being better than a threshold value during a specific duration.

5. The method of claim 3, wherein the first data communication is performed using the second type of resource, based on a channel state being better than a threshold value during a specific duration.

6. The method of claim 3, wherein the first type of resource is relatively small in size relative to the second type of resource.

7. The method of claim 3, wherein the first type of resource has a separate reference signal (RS).

8. The method of claim 1, further comprising:
   receiving, from a network, information indicating a communication direction on the resources.

9. The method of claim 1, further comprising:
   receiving, from a network, a time duration in which the resources are valid.

10. The method of claim 1, further comprising:
    transmitting, to a network, assistance information related to the resources.

11. The method of claim 10, wherein the assistance information includes information indicating how long the data communication is performed.

12. The method of claim 10, wherein the assistance information includes information about whether at least one parameter for the resources is suitable for the first data communication.

13. The method of claim 10, wherein the assistance information includes at least one of release information for the resources or change request information for the resources.

14. A user equipment (UE) in a wireless communication system, the UE comprising:
    a transceiver; and
    a processor operably coupled to the transceiver and configured to:
    determine resources that are semi-statically configured for a first data communication; and
    perform, on at least one of the resources, the first data communication,
    wherein the first data communication has a relatively short latency requirement compared to a latency requirement of a second data communication,
    wherein, in case the first data communication is performed, puncturing a resource for the data communication is performed, and
    wherein, in case the first data communication is not performed, puncturing a resource for the data communication is not performed.

* * * * *